United States Patent
Schott, Jr.

[11] 4,230,029
[45] Oct. 28, 1980

[54] CUTTING ASSEMBLY USEFUL IN BAG MACHINES

[75] Inventor: Charles M. Schott, Jr., Atkinson, N.H.

[73] Assignee: Gloucester Engineering Co., Inc., Gloucester, Mass.

[21] Appl. No.: 955,068

[22] Filed: Oct. 26, 1978

[51] Int. Cl.³ .......................... B31B 1/14; B31B 19/14
[52] U.S. Cl. ..................................... 93/33 H; 83/831; 83/614
[58] Field of Search ................. 93/33 H; 83/831, 830, 83/614, 455, 327, 661

[56] References Cited

U.S. PATENT DOCUMENTS

| | | | |
|---|---|---|---|
| 2,852,048 | 9/1958 | Cox | 83/831 |
| 3,163,971 | 1/1965 | Loliger et al. | 93/84 TW |
| 3,192,096 | 6/1965 | Rhine | 156/513 |
| 3,972,254 | 8/1976 | Dillinger et al. | 83/831 X |
| 4,081,009 | 3/1978 | Curlett | 83/830 |

Primary Examiner—R. L. Spruill
Assistant Examiner—K. Y. Lin

[57] ABSTRACT

A bag machine for permitting action on multiple widths of web and capable of high speed operation. A rigidifying beam supports the heat seal bar. The heat seal bar is thermally isolated from the beam and the flange of the beam is protected against heat loss. A belt and sprocket assembly that propels a cutter blade across the web path are aligned in a plane set at an angle to the axis of the beam. The sprockets have diameters comparable to the height of the beam and position the cutter blade adjacent the heat seal bar at the lower edge of the beam. The blade is attached by a plate inserted between teeth of the belt with a corresponding tooth omitted from the sprocket. An insulating heat shield also serves to support a protective curtain and a novel lift arrangement is provided for the entire head assembly and upper nip rolls.

4 Claims, 6 Drawing Figures

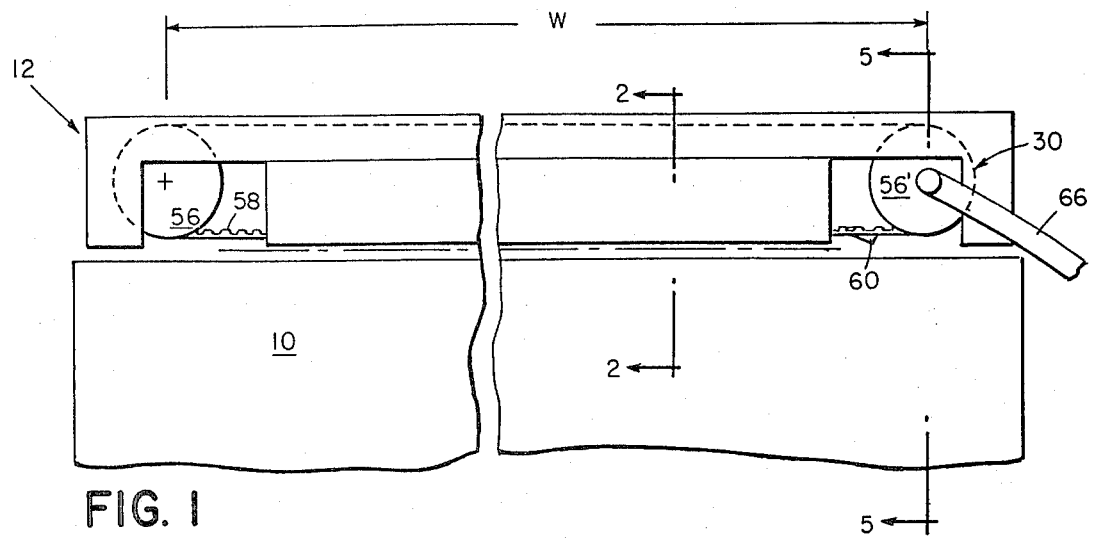
FIG. 1
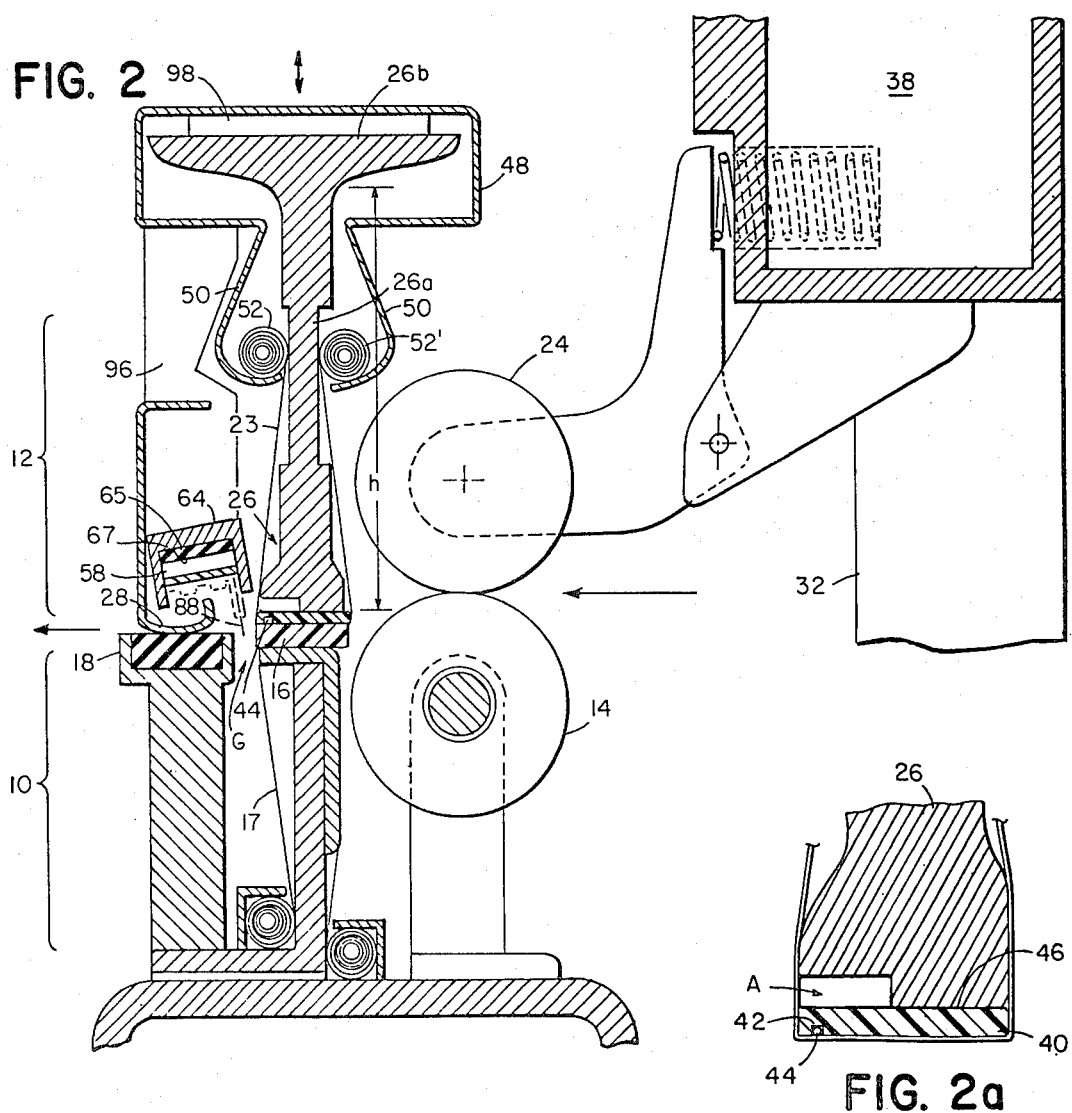
FIG. 2
FIG. 2a

CUTTING ASSEMBLY USEFUL IN BAG MACHINES

BACKGROUND OF THE INVENTION

This invention relates to machines for forming plastic bags. In such machines opposed heat seal bars that contain electrically heated elements are pressed together to form a weld, as for the bottom of a bag, and a slitter knife is moved by an endless belt across the width of the web to sever one finished bag from the next in line.

Machines of this type have been successful within a range of widths of web and speeds of operation. It is desired, however, to employ the same type of operation across much wider web paths, for instance for acting upon multiple webs at once, to operate the machines at faster speeds, to provide long-life components, and to provide more accurate operation. To achieve these capabilities it is impossible simply to scale up smaller or slower machines, because the tendency for distortion of the mechanical components has an increasing detrimental effect.

The purpose of the present invention is to provide design features which overcome these difficulties and permit the construction of a wide bag making machine, as wide as 90 inches, that is capable of very high speeds of operation.

SUMMARY OF THE INVENTION

According to one aspect of the invention, a deep rigidifying beam is employed to serve as the reference for the heat sealing bar and the protective fluoro-carbon curtain and special provisions are made for alleviating thermal distortion. The heat seal wire is thermally isolated from the beam which positions and carries it and at the same time the upper end of the beam, including the flange which gives the beam its rigidifying moment of inertia, is shielded from heat loss.

The invention also features an improved cutting assembly. The assembly comprises a set of sprockets aligned in a plane, with an endless belt trained thereover for carrying the knife. This plane is set at an angle to the beam of the heat seal bar, thus permitting an increased diameter of the sprocket while at the same time enabling the belt to position the knife in close proximity to the heat seal element.

Another feature of importance to high speed as well as long servicable life of the cutting assembly is a special provision for attachment of the cutter to the belt. A transverse series of holes at a single point along the length of the belt is provided and the belt holder is secured thereto by means of a plate which fills the gap between successive teeth of the belt. The toothed periphery of the belt sprockets is specially constructed to omit teeth in registry with the plate. Also a cushioned track is provided for receiving the belt as it leaves the sprocket and moves along its cutting path across the width of the machine.

The invention features a mounting arrangement both for the heat seal head and the upper nip rolls in which all are bodily moved upwardly on a set of columns when it is desired to service the machine. Advantageously, a push rod which acts upon the parallelogram mounting of the heat sealing head moves with this assembly.

The invention also features a heat insulating shield for the heat seal bar beam that also supports the protective curtain; a bag clamp that is positioned by the beam, to lie below the angled cutter belt, and construction that permits conversion to side weld operation.

These and other objects and features of the invention will be understood from the following description of a preferred embodiment.

BRIEF DESCRIPTION OF THE DRAWINGS

In the drawings

FIG. 1 is a diagrammatic elevation of the preferred embodiment, viewing into the discharge side of the bag machine, to show the arrangement of the cutting assembly to the machine;

FIG. 2 is a partially diagrammatic cross-sectional view of the machine taken on line 2—2 of FIG. 1;

FIG. 2a is a view of the lower part of the heat seal bar of FIG. 2 on an enlarged scale;

DESCRIPTION OF PREFERRED EMBODIMENT

Figure 5:
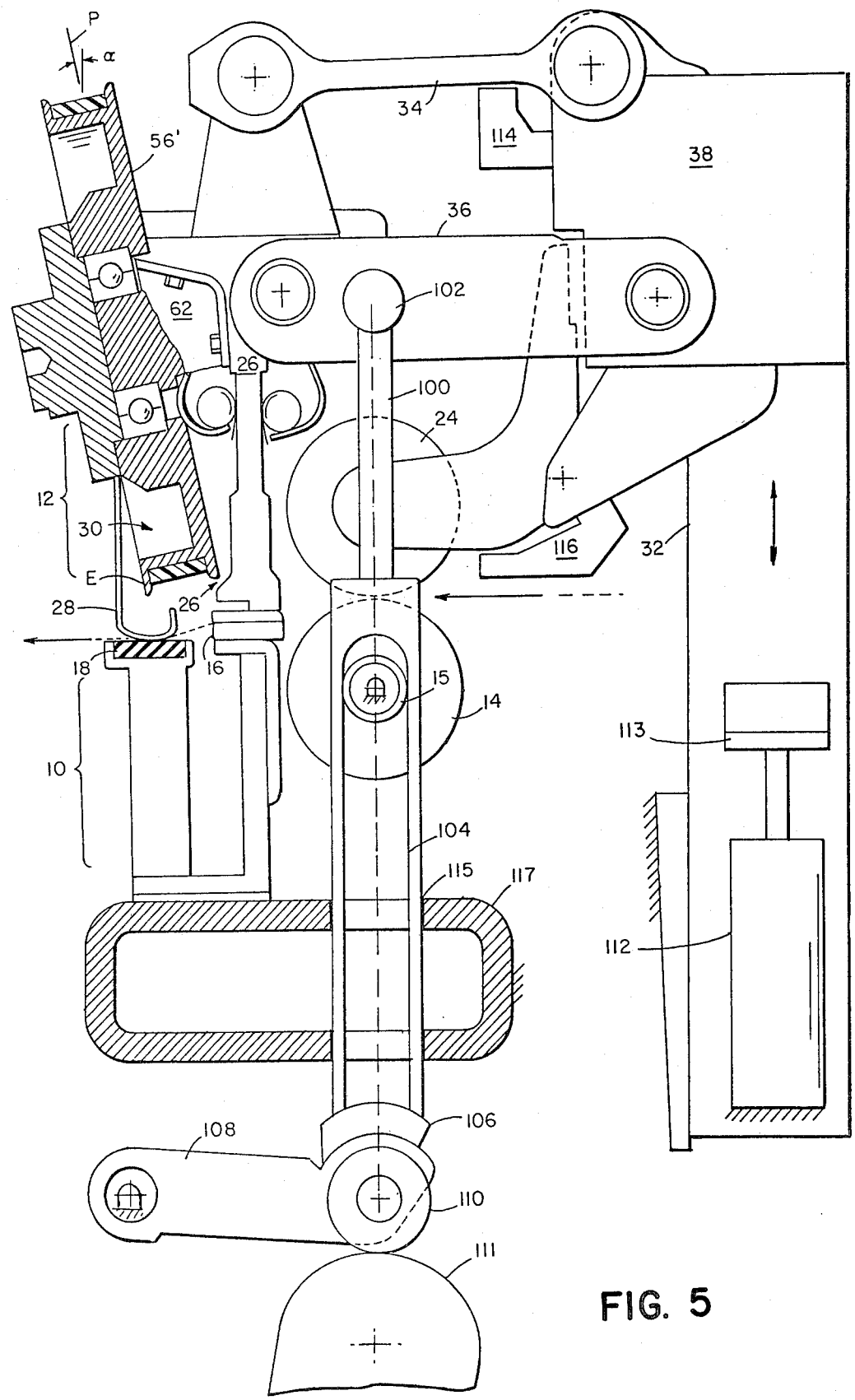
FIG. 5 is a cross-sectional view of the machine taken on line 5—5 of FIG. 1.

Referring to FIGS. 1, 2, and 5, the machine comprises bottom assembly 10 and head assembly 12. The major components of the bottom assembly are a lower nip roll 14; a bottom heat seal bar 16; an arrangement for protective curtain 17; and lower bag clamp 18. The principal components of the head assembly are upper nip roll 24; upper heat seal bar 26; an arrangement for protective curtain 23; top bag clamp 28; and cutter mechanism 30. These are all grouped compactly together and extend throughout the operative width of the machine.

In operation, the upper heat seal bar 26, protective curtain 23, cutter assembly 30 and clamp 28 are joined via a beam element to turn on a parallelogram linkage. This linkage is formed by upper links 34 and lower links 36 attached to pivot relative to girt 38 during each bag-forming cycle. During the cycle, nip roll 24 remains in nipping relation to lower nip roll 14. Furthermore, the upper nip roll together with all of the other head components are arranged to move bodily together on columns 32 to separate the upper and lower nip rolls and bring the other head components into position for maintenance. The upper heat seal bar 26 of "T" beam form, is comprised of web or stem 26a of considerable height and upper integral flange 26b having an overhang on both sides of web 26a. This form provides a large moment of inertia for beam stiffness. It is preferably formed of high conductivity metal such as aluminum. The total height of the beam profile is 5 inches, and is constant throughout the width W of the machine (which may be e.g. 60 to 100 inches). As shown in the magnified view of FIG. 2A, at the lower end of heat seal bar 26 is a strip of electrically and thermally insulating material 40 which includes a slot 42 in which is located an electrical resistance heat seal wire 44. The strip is composed of a laminate of glass and silicone resin. The mating lower end of the beam 26 is notched as shown. This provides a thermal isolation region A at the left-hand portion of the cross-section, immediately above the heat seal wire 44, while providing a lower mounting seat 46 at the right-hand portion against which the strip 40 is secured as by a threaded bolt (not shown). This construction provides a restricted heat flow path from the heat seal wire 44. To enter the web 26a of the beam, the heat must travel over the full length of the insulating strip. The strip also provides a cantilever action for the heat seal wire 44 which offers an advantage of resilience in some instances.

The flange 26b of the beam 26 is surrounded throughout its length by sheet metal shield 48 in the manner shown. Thus, air currents from the surroundings are prevented from passing past the flange 26b and thus heat loss from the flange is restricted. Lower integral portions 50 of the shield 48 extend downwardly from the flange region to similarly insulate the beam and to define supports for the bobbins 52. The curtain 23 extends from bobbin 52 downwardly beneath the heat seal bar and then upwardly to the bobbin 52'.

Figure 3:
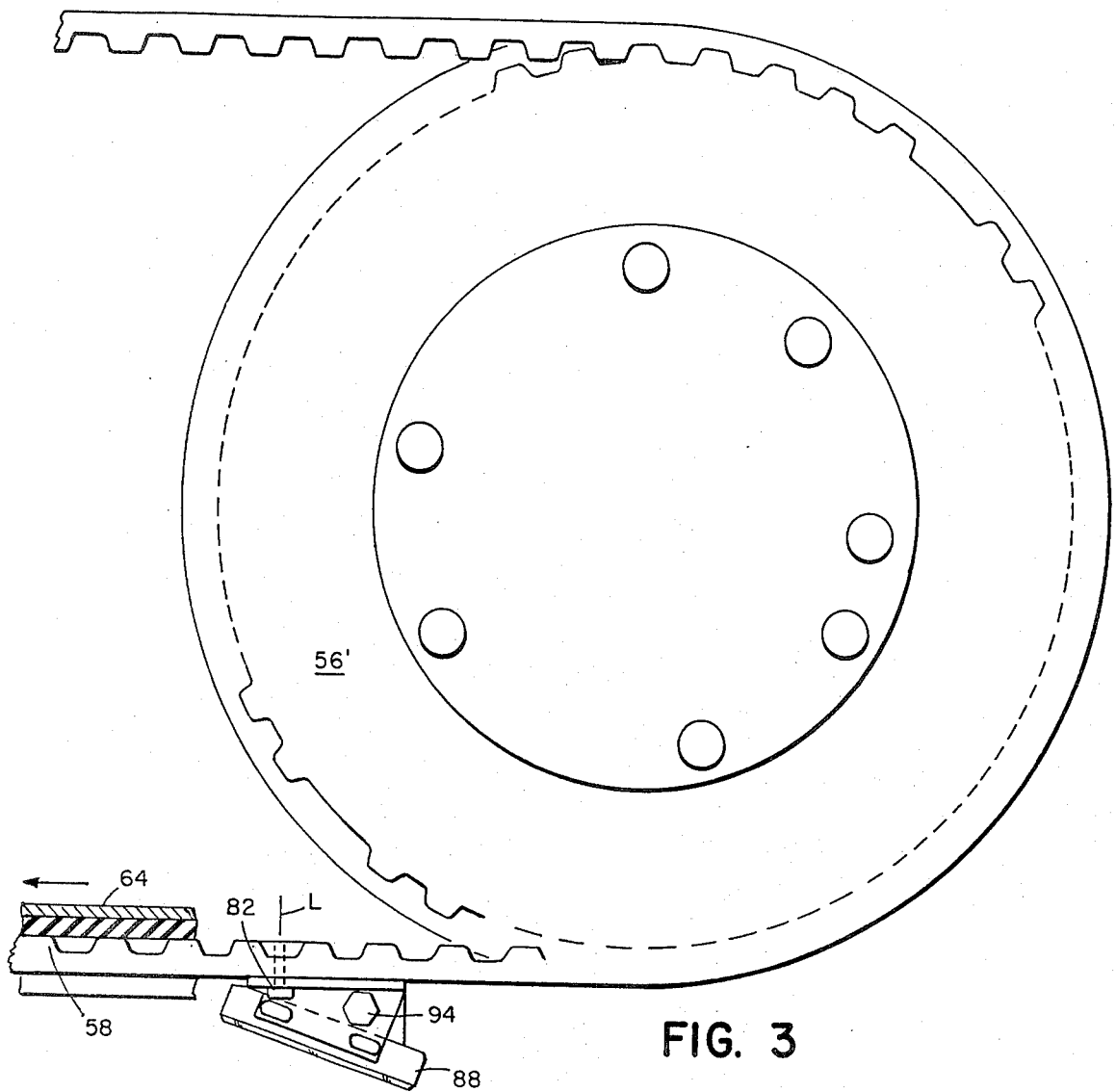
FIG. 3 is an elevation, on a magnified scale, of a portion of the cutting assembly of FIG. 1.

Referring to FIGS. 1 and 5, the cutting assembly 30 is comprised of two sprockets 56 and 56' between which extends a toothed timing belt 58 with an inner side and an outer side to which a blade holder 60 is secured. As illustrated in FIG. 5, the plane P of the sprockets and the endless belt 58 threaded around these sprockets is set at an acute angle $\alpha$ with respect to the vertical; these sprockets are secured by mounting 62 to the beam member 26. The effect of this angular mounting of the sprockets is to enable use of large diameter sprockets, minimizing acceleration effects and undue flexing of the belt, while positioning the lower run of the belt 58 in close proximity to the heat seal wire 44. The lower edge E of the sprockets, see FIG. 5, is aligned with a three-sided track 64. The belt leaves sprocket 56' and enters the track 64 in a horizontal run tangential to the lower part of the sprockets; the belt continues across the full width W of the machine and then leaves the track to tangentially approach the lower part of the opposite sprocket. The top run of the belt denoted in dashed lines in FIG. 1 is similarly horizontal and tangential to the upper edges of the sprockets 56 and 56'. Referring to FIG. 3, both the timing belt 58 and the sprockets 56, 56' are provided with teeth to ensure precise positioning of the belt 58 relative to the rotational displacement of the sprocket 56. Thus the sprocket 56, while driven by a positive drive via flexible drive coupling 66, can positively position the cutter blade for the commencement of each cutting cycle.

Figure 4:
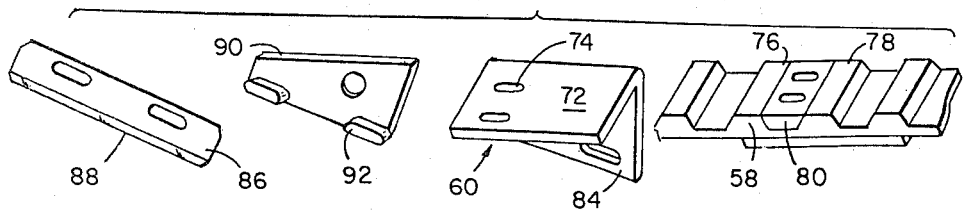
FIG. 4 is a perspective view of individual pieces employed in the cutting assembly of FIG. 3.

The means of attachment of the blade to the belt is important for the realization of a strong, low weight and long lasting assembly. Referring to FIGS. 3 and 4, a blade holder 60 has an upper flange or base plate 72 provided with two holes 74 aligned in the transverse direction relative to belt 58. Between two teeth 76 and 78 of the belt, two corresponding holes are provided. A nut plate or back plate 80 closely fits the space between the two teeth 76, 78, with threaded holes corresponding to holes in the belt and in the flange 72 of the blade holder. Screws 82 extend through the mounting plate and are threaded into nut plates 80, thus joining the holder flange 72 firmly at one location L along the belt with compressional stress spread over a large land area of the belt (i.e. without detrimental stress concentration). With reference to FIGS. 3 and 4 it will be seen that base plate 72 extends longitudinally along the outer side of the belt 58 a distance substantially longer than the corresponding dimension of the back plate 80.

The blade holder has a depending, off-center flange 84 aligned with the edge of the belt closest to the heat seal wire 44, this flange being provided with two elongated holes. A cutting blade 86 similarly has two elongated holes so that when the holes are aligned the blade provides a cutting edge 88 below flange 84. A mounting plate 90 has projections 92 which mate with the elongated holes of the other elements. To secure these parts together a single threaded bolt 94 extends through the hole in the mounting plate 90, passes above the blade 88, and is threaded into an opening in the flange 84. It will be noted that the blade 88 is thus positioned parallel to plane P, at the extreme edge of the belt 58, and in close proximity to the heat seal wire 44. The track 64 for the belt is provided with a cushioning layer 65, along its upper wall, while an anti-friction surface 67 is provided on the undersurface of this cushioning layer for anti-friction engagement with the teeth of the belt. Similarly, the sides of the track 64 are provided with anti-friction surfaces for engaging the belt.

The sprockets 56 and 56' are of special construction in that at preselected points, mating with the position of the nut plate on the belt 58, a tooth is omitted from the sprocket to provide space for the nut plate. By establishing the total length of the belt as an even multiple of the spacing, in numbers of teeth, between the blank portions on the sprocket, registry of the two can be assured. The diameter of the sprocket is intentionally made large, approximating the entire height of the beam 26.

The various features of this cutting belt arrangement have a desirable effect on the expected life of the cutting assembly: the single point of attachment to the belt of the cutting blade holder minimizes the restriction of the belt against bending, thus to avoid stress concentrations; at the same time the large diameter of the pulleys limits the amount of flexing required of the belt as it makes its turn, and also serves to limit the amount of centrifugal force applied to the blade holder as it turns about the sprocket; the off-center relationship of the blade relative to the belt enables close proximity to the heated wire and does not introduce detrimental stress because the moment of greatest stress upon the blade holder, as it accelerates around the sprocket, is precisely the time when the belt is steadied by face-to-face contact with the sprocket and thus prevented from twisting. As the belt leaves the sprocket to begin its lower run, see FIG. 3, the belt enters the track 64 shown in FIGS. 2 and 3. The cushioning material 65 accommodates the tendency of the belt to whip as it suddenly changes from turning acceleration, as it turns about the periphery, to straight line movement as it leaves the periphery of the pulley. This too decreases the wear tendencies of the belt and gives the cutter assembly a long life.

The "T" profile element 26 is the main structural element of the reciprocating head. It supports, as mentioned previously, the sprockets 56 and 56', and thus the entire cutting assembly. In addition, by supports 96, it positions bag clamp 28 in the cupped relation shown, in which the clamp lies directly below the cutter belt 58 and track 64. Additionally, the beam supports the sheet metal enclosure 48 by stand offs 98 and others not shown, the lower portions of which, as mentioned, support the heat resistant curtain 23 in the efficient, compact relationship shown in the figures.

Reciprocation of this entire heat seal assembly is effected by a push rod 100 which engages lower parallelogram linkage 36 at a ball fitting 102. This push rod is in axial alignment with the drive shaft of the nip rolls, the push rod having a slot 104 to accommodate the shaft. This push rod extends downwardly to a bronze curved shoe 106 which rests upon a mating curved shoe on cam follower link 108. As the roller 110 of the cam follower rides upon the control cam 111, the shoe 106 follows the motion of the cam follower to raise push rod 100, thus to raise linkage 36, and thus to raise the head assembly relative to girt 38. While the details of the parallelogram linkage are not shown in detail, it will be understood that both links are pivotally connected to the "T" beam 26 as well as to the girt. The control cam is driven in timed relation to the nip rolls such that, after a given number of turns of the nip rolls to feed the desired length of plastic into the machine, the cam 111 causes cam followers 108 to drop, dropping the push rod 100 and thus causing the head assembly to drop to the position shown in FIGS. 2 and 5. The head drops due to its own weight and to assisting springs, not shown. The upper seal bar tightly engages the lower heat seal bar, capturing the plastic film therebetween, while on the downstream side the clamp 28 comes to rest against stationary clamp 18, similarly grasping the bag on the opposite side of gap G. As soon as the plastic is thus grasped on both sides of gap G, the timing mechanism rotates the flexible cable drive which rotates the sprockets 56 rapidly through one precise cutting cycle whereby the knife blade 88 moves through a full cycle of the endless belt path. As the knife traverses the lower run of the belt, it extends into the gap as shown in FIG. 2, and slices the plastic film. In close synchronization, the heat seal bars form the desired weld of the plastic as the knife 88 completes its cut. Thereupon, in timed sequence, the control cam raises cam follower 110 which in turn raises shoe 106, push rod 100 and parallelogram linkage 36, thus to raise the entire head assembly. The upper and lower nip rolls 24 and 14 remain engaged and are thereupon precisely activated to forward the plastic film through the now opened space left by the raising of the heat seal bar 26 with its curtain, the entire cutting assembly 30, and the clamp 28. Thus the welded bag is thrust through the machine for a given length determined by the drive mechanism and the cycle recommences.

For maintenance purposes, the girt 38 is raised by columns 32 in matching guides through the action of air cylinder 112 which acts upon bracket 113 attached to each column 32. As the girt 38 rises, it carries with it the parallelogram linkage and the upper nip rolls. Stops 114 and 116 are provided to prevent undue rotation downwardly of the head assembly and nip roll assembly from the positions shown in FIG. 5.

During the upward motion of the columns 32 and the head assembly, the push rod 100 is also drawn upwardly, with the shoe 106 disengaging from the cam follower shoe. The push rod is retained in alignment therewith by the opening 115 in stationary girt 117. This movement is accommodated by the slot 104 provided in the push rod, to accommodate the drive shaft 15 of the lower nip roll.

What is claimed is:

1. In a cutting assembly useful in a bag machine, the cutting assembly being of the sprocket and endless belt type in which a cutting blade is secured to the belt and is moved in a path between spaced apart sprockets as the sprockets rotate in engagement with the belt, the improvement wherein, the belt is of the timing-belt type constructed of flexible material with an inner side and an outer side and having a series of equally spaced, formed teeth and intervening, formed grooves, along its inner side the sprockets have corresponding grooves and teeth constructed to mate respectively with the teeth and grooves of the belt, the cutting blade is mounted on the belt by a blade holder disposed on the outside of the belt, a back plate on the inside of the belt, and bolt means extending through the thickness of the belt, joining said blade holder and back plate, said back plate dimensioned to fit in a single said groove in said belt between a pair of said belt teeth, said bolt means extend through said belt at only a single location along the longitudinal length of said belt, corresponding to the location of said single groove, and each of said sprockets has its series of equally spaced teeth interrupted by the omission of a tooth corresponding to the groove of said belt in which said back plate is located.

2. The cutting assembly of claim 1 wherein for a given stroke across the full width of web to be cut by said assembly, there is a single said cutting blade attached to said belt, and driving means are provided to cause said blade to traverse the full width of said web during a cutting cycle.

3. The mechanism of claim 1 wherein said blade holder includes a base plate extending longitudinally along the outer side of said belt a distance substantially longer than the corresponding dimension of said back plate, said bolt means being attached to said belt through said base plate, said base plate joined to a depending flange to which said blade is attached.

4. The assembly of claim 1 including a track aligned with the cutting blade of the belt, said track including cushioning means exposed to engage the inner surface of the belt to cushion and position said belt, and the cutter attached thereto, during cutting motion of said belt.

* * * * *